April 2, 1968   M. R. L. THURNER   3,375,594
GROUND-BASED AIRCRAFT FLIGHT SIMULATING APPARATUS
Filed March 17, 1966   4 Sheets-Sheet 1

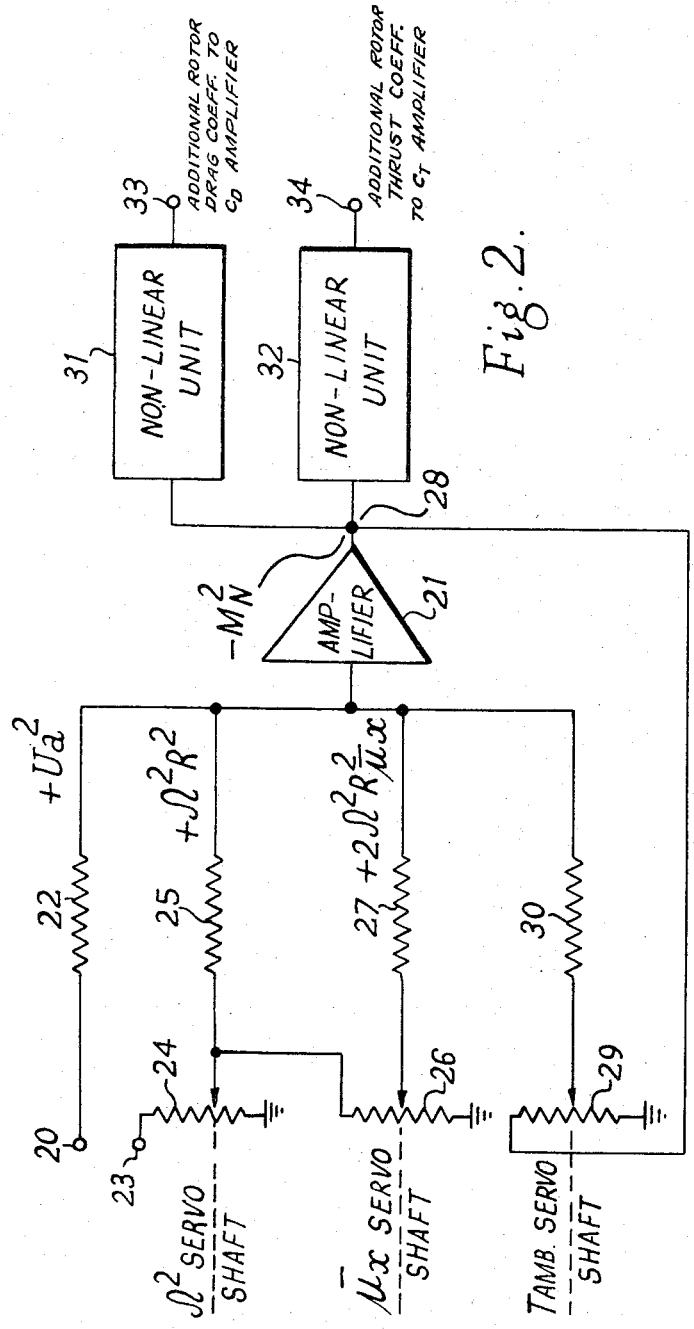

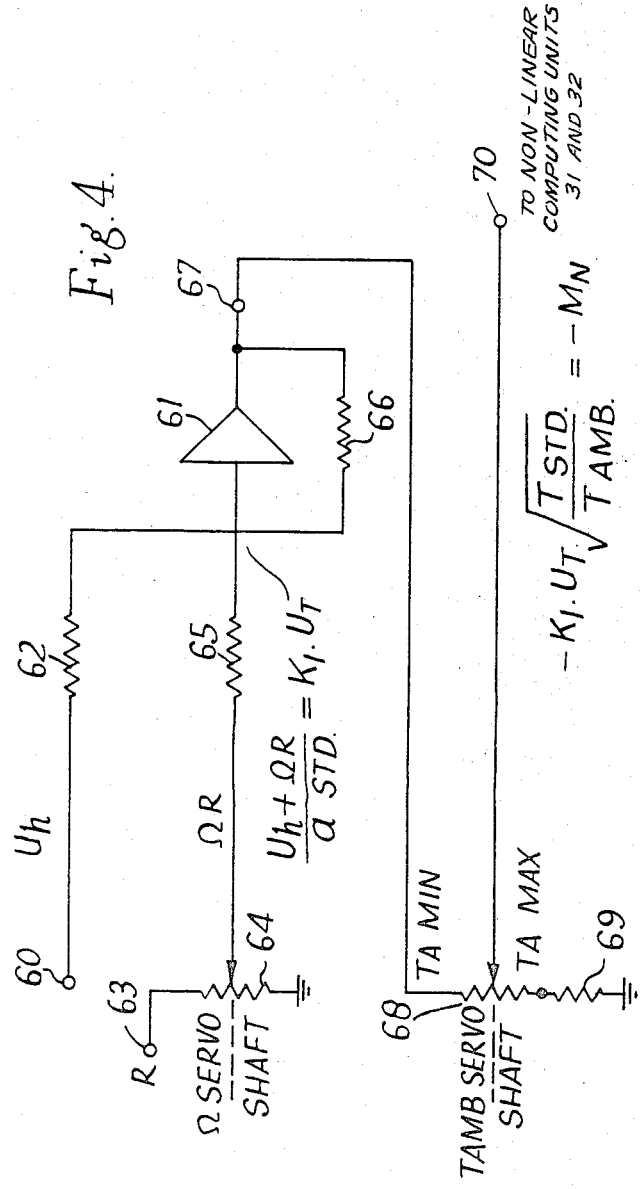

INVENTOR
MICHAEL R. L. THURNER

United States Patent Office 3,375,594
Patented Apr. 2, 1968

3,375,594
GROUND-BASED AIRCRAFT FLIGHT
SIMULATING APPARATUS
Michael Richard Louis Thurner, Horsham, England,
assignor to Communication Patents Limited
Filed Mar. 17, 1966, Ser. No. 535,378
Claims priority, application Great Britain, May 3, 1965,
18,561/65
7 Claims. (Cl. 35—12)

ABSTRACT OF THE DISCLOSURE

A ground-based aircraft flight simulating apparatus comprising a pilot's compartment provided with controls and instruments, a computer by which the instruments are actuated, and an instructor's console from which computed conditions are controlled wherein the compressibility effects which occur when parts of a rotor of a helicopter reach airspeeds approaching the speed of sound are simulated. Mach number of an element of a rotor blade of a helicopter is computed at one azimuth angle of the rotor disc, from electrical signals representing aircraft forward speed, rotor rotational speed and the square root of a function of ambient temperature, whereby an output is produced which is a function of the computed Mach number. Similar means for computing Mach number are also provided.

This invention relates to ground-based aircraft flight simulating apparatus for simulating helicopter flight, and provides a system for simulating compressibility effects which occur when parts of a rotor of a helicopter reach airspeeds approaching the speed of sound.

The altitude, attitude and direction of flight of a helicopter is controlled by varying the pitch of the blades of the main and tail rotors. The pitch of the blades of the main rotor determines the lift and drag produced by the main rotor and the flapping and in-plane blade motions about the blade hinges. The resultant main rotor force, absorbed torque and orientation, and the tail rotor force, give rise to forces and moments on the helicopter fuselage which determine the fuselage motions.

In a flight simulator, signals corresponding to settings of flight and engine controls, located in a pilot's compartment, are fed to a computer, the outputs of which are supplied to instruments for indicating to the pilot responses of the aircraft when operated under conditions set up at an Instructor's station. In order to achieve faithful simulation in a flight simulator for a helicopter, it is necessary to compute rotor performance in a manner which takes into account the dynamics of the main rotor, since this affects both the control and the stability of a helicopter.

The performance of the main rotor of a helicopter may be determined in a computing system in which a blade is considered to be composed of a number of blade elements, the net rotor forces and moments being represented by the sum, over the whole rotor disc, of increments due to the several blade elements. In this form of computing system, the elemental contributions at many points in the rotor disc are evaluated, using, for example, eighteen computing channels. The contributions are summed in a plurality of summing devices to yield the net forces and moments.

It is possible, by making certain assumptions, to simplify the equations concerned with the elemental contributions, to enable these contributions to be integrated over the rotor disc, so that a composite equation for the whole rotor contribution may be derived therefrom. The computation is thereby simplified with consequent saving of space and cost of analogue computing apparatus.

The least valid of the simplifying assumptions which can be made are that aerodynamic lift is given by a curve of constant slope and that profile drag coefficient is a constant. Theoretical investigation of the properties of a lifting rotor reveals that both lift curve slope and profile drag coefficient are functions of angle of attack and Mach number. One important effect of this is a sharp increase in the drag of the rotor which occurs in flight as the airspeed of blade extremities of the rotor approach the speed of sound.

It is an object of the present invention to provide a simplified computing system for simulating compressibility effects which occur when parts of the blades of a helicopter rotor have airspeeds approaching the speed of sound.

Accordingly one aspect of the present invention provides ground-based aircraft flight simulating apparatus, for simulating helicopter flight, including computing means for computing Mach number of an element of a rotor blade of a helicopter, at an azimuth angle of the rotor disc, where the forward speed of the said element is a maximum, from electrical signals representing aircraft forward speeds, rotor rotational speed and the square root of a function of ambient temperature and means for providing at least one output from the said computing means which is a function of the computed Mach number, whereby effects due to changes in the flow characteristics of air with respect to the rotor blades rotating therein, may be simulated.

Another aspect of the present invention provides ground-based aircraft flight simulating apparatus, for simulating helicopter flight, including computing means for computing Mach number squared of an element of a rotor blade of a helicopter at one azimuth angle of the rotor disc, from electrical signals representing aircraft forward speed squared, rotor rotational speed squared and a function of ambient temperature and means for providing at least one output from the said computing means which is a function of the computed Mach number squared, whereby effects due to changes in the flow of air with respect to the rotor blades rotating therein may be simulated.

In order that the invention may be readily carried into effect, an embodiment thereof embodying both the aspects of the invention will now be described in detail, by way of example, with reference to the accompanying drawings, in which:

FIG. 2 is a schematic diagram of a computing system, according to the present invention, for simulating compressibility effects associated with a helicopter main rotor when moving at high airspeeds;

FIG. 4 is a circuit diagram of the second embodiment of the invention; and

As the speed of moving parts, in this example the extremities of the rotor blade of a helicopter, approach the speed of sound, the airflow changes abruptly from viscous to compressible fluid conditions, so causing the generation of shockwaves. The principal effect of compressibility is a sharp increase of drag of the extremities of the blades and hence in the power required to fly the aircraft at high forward speeds.

The part of the rotor of a helicopter most likely to be affected by compressibility is the tip of an advancing blade, at that part of a revolution of the rotor where the axis of the blade and the lateral axis of the aircraft are substantially coincident.

The relative airflow at this point is the sum of the rotational tip speed of the rotor and the forward speed of the helicopter. At high forward speeds, the relative airflow velocity increases to a value where Mach number effects become significant and the rotor drag and absorbed torque both rise. Hence, the power required to fly at higher speeds rises steeply.

In order to simulate these effects fully, using the computing system first referred to earlier in the specification the local Mach number of each blade element is computed and from these outputs, the drag coefficients of each element are determined. A complete summation over the rotor disc, in real time, using these coefficients, is then carried out to obtain the rotor drag and absorbed torque transmitted through the hub to the helicopter fuselage.

In a computing system according to the present invention, Mach number, or more conveniently Mach number squared, is computed at one azimuth angle of the rotor disc and the effects of compressibility are then introduced as a function of the computed result.

Mach number is computed from signals representing aircraft forward speed, rotor rotational speed, and the square root of the inverse of the ratio: ambient temperature/standard sea level temperature. Mach number squared is thus computed from aircraft forward speed squared, rotor rotational speed squared, and the inverse of the ratio: ambient temperature/standard sea level temperature.

Figure 1:
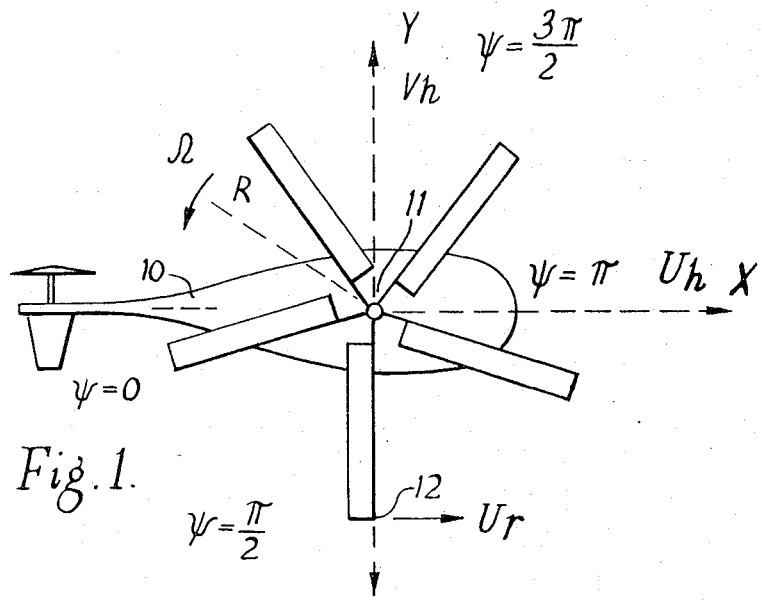
FIG. 1 shows, in diagrammatic form, a plan view of a helicopter in which aircraft forward and lateral axes and rotor azimuth angles are indicated.

In FIG. 1, it is assumed that the direction of flight of a helicopter 10 is such that hub 11 of the main rotor has a velocity $U_h$ along the X axis of the aircraft and that the rotor is rotating at speed $\Omega$. The tip of a blade 12 of radius R is assumed to be at that position in a revolution where the azimuth angle of the rotor blade is $\pi/2$ radians measured in the direction of rotor rotation with respect to the longitudinal or negative X axis of the aircraft. Therefore, the velocity of a blade tip is $\Omega R$ and the tangential velocity $U_T$ of the tip of blade 12, at rotor azimuth position $\pi/2$ is $\Omega R + U_h$.

It will be seen from an appendix, provided at the end of the body of the specification, that Mach number squared of the blade tip is given by the expression $$M_N^2 = \frac{K.1}{T_{AMB}}[(\Omega R)^2 + 2\Omega^2 R^2 \bar{\mu}_x + U_A^2] \quad (5)$$

All of the terms of this expression are available in the computer of a conventional helicopter flight simulator, as electrical signals or mechanical shaft outputs, the magnitudes or angular displacements of which correspond to the magnitudes of the terms of the expression.

The computer includes a system for computing rotor performance in which rotor torque, thrust, forward force and side force are derived from rotational speed of the rotor, collective pitch and cyclic pitch control settings in the pilot's compartment, and computed components of total velocity.

Hub velocities along the aircraft X, Y and Z axes and rotor thrust, drag and torque coefficients, are signals provided by computing amplifiers of the system. Servos, also forming part of this system, provide output shaft displacements corresponding to the terms $\bar{\mu}_x$ and $\Omega^2$ representing hub forward velocity ratio and rotor rotational speed squared, respectively. The term $R^2$, representing the radius of the rotor squared, is available as an electrical signal of constant magnitude. As will be seen from the appendix, the hub velocity ratio $\bar{\mu}_x$ is employed in order to simplify computing. A servo, forming part of the atmosphere computing system of the simulator provides an output shaft displacement corresponding to $T_{AMB}$, representing air temperature at the altitude at which simulated flight is taking place. The term $U_A^2$, representing aircraft velocity squared along the X axis, is provided by an amplifier which is part of the flight computing system.

In FIG. 2. $-M_N^2$ is computed in a system which is indicated generally by the reference number 35.

Referring to FIG. 2, a signal, of positive polarity, corresponding to the term $U_A^2$, is fed to a terminal 20 and thence to the input of a computing amplifier 21, by way of a summing resistor 22. A signal of positive polarity, corresponding to the term $R^2$ is fed to a terminal 23, to which is connected one end of the winding of a potentiometer 24, the other end of which is connected to ground. The wiper of the potentiometer 24 is mechanically coupled to the shaft of the $\Omega^2$ servo, so that a signal corresponding to the term $\Omega^2 R^2$ is available from the wiper. This signal is fed to the input of the amplifier 21 by way of a summing resistor 25.

The signal from the wiper of the potentiometer 24 is also fed to one end of the winding of a potentiometer 26, the other end of which is connected to ground. The wiper of the potentiometer 26 is mechanically coupled to the shaft of the $\bar{\mu}_x$ servo, so that a signal corresponding to the term $\Omega^2 R^2 \bar{\mu}_x$ is available from the wiper. This signal is fed to the input of the amplifier 21 by way of a summing resistor 27. A signal from a terminal 28, connected to the output of the amplifier 21, is fed to one end of the winding of a contoured potentiometer 29, the other end of which is connected to ground. The wiper of potentiometer 29 is mechanically coupled to the shaft of the air temperature servo of the atmosphere computing system. The signal from the wiper of the potentiometer 29 is fed to the input of the amplifier 21, by way of a summing resistor 30, to provide feedback, so that the gain of the amplifier is varied in a manner to produce an output signal from terminal 28 corresponding to $M_N^2$ in Equation 5. The values of the input summing resistors 22, 25, 27 and 30 are such that the individual inputs have the required relationship to satisfy Equation 5.

The signal from the output terminal 28 is also fed to non-linear computing units 31 and 32 from which rotor drag coefficient and rotor thrust coefficient signals respectively, are fed to terminals 33 and 34 respectively. The non-linear computing units 31 and 32 function in a manner which will be described in detail later in the specification. The terminal 33 is connected so as to provide an additional input to an amplifier in which total rotor drag coefficient, corresponding to the term $C_D$, is generated; the terminal 34 is connected so as to provide an additional input to an amplifier in which total rotor thrust coefficient, corresponding to the term $C_T$, is generated, these amplifiers being part of the system in the computer for computing rotor performance, as already stated.

The units 31 and 32 each serve a double purpose, first to ensure that signals of appreciable magnitude are fed to terminals 33 and 34 only if a certain predetermined value of Mach number squared is exceeded; secondly to enable the drag and thrust coefficients to increase according to a law exceeding in power the square law provided by the output signal of the amplifier 21, when the predetermined value of Mach number is exceeded.

Figure 3:
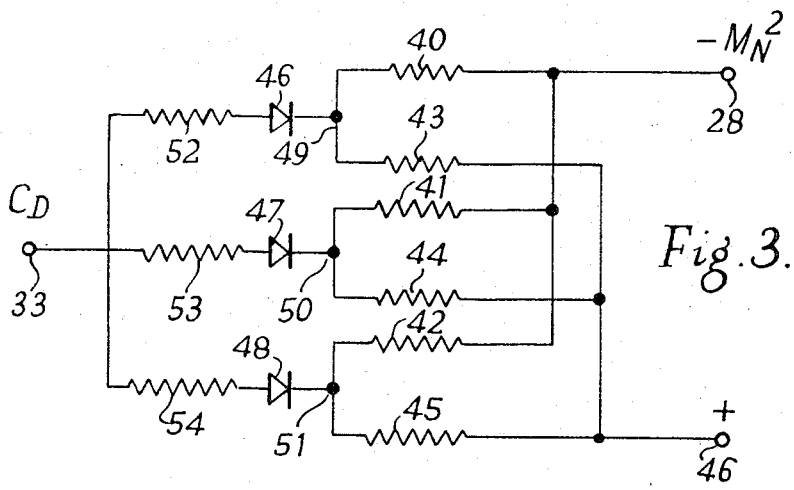
FIG. 3 is a schematic diagram of a unit for generating a non-linear function, used in the computing system of FIG. 2.
Figure 5:
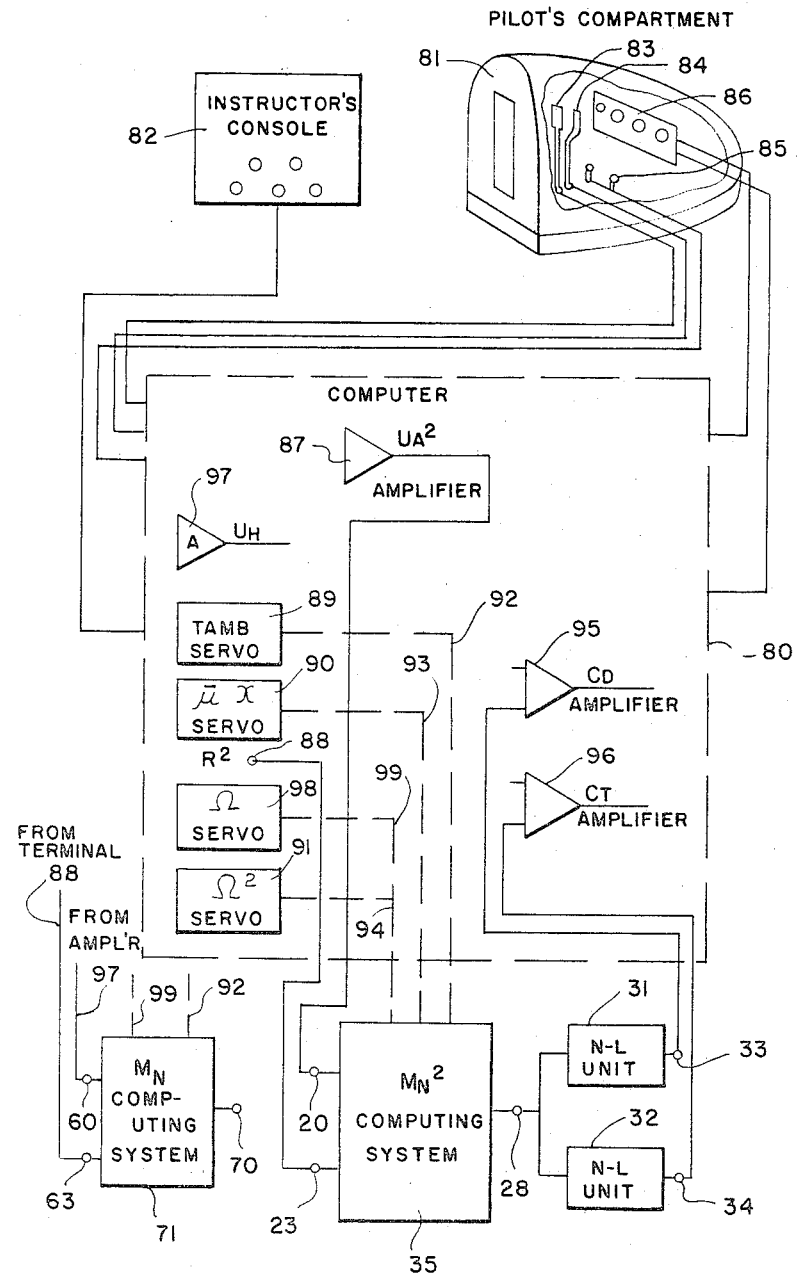
FIG. 5 is a schematic diagram of a helicopter flight simulator incorporating apparatus according to the present invention for simulating effects associated with a helicopter main rotor.

The non-linear computing units 31 and 32 are of similar design, the circuit of unit 31 being shown in FIG. 3.

In FIG. 3, the $-M_N^2$ signal from terminal 28 is fed to resistors 40, 41 and 42 and an input biasing voltage is fed to resistors 43, 44 and 45 from a source of supply of positive polarity, not shown in the drawing, connected to terminal 46. The free ends of pairs of resistors 40, 43; 41, 44; and 42, 45 are connected to diodes of the semiconductor type 46, 47 and 48 respectively, at points 49, 50 and 51 respectively.

input of amplitude representative of $R^2$ and controlled by a servo shaft displaced according to the value $\Omega^2$, the third input is derived from the wiper of a second potentiometer having anput derived from the said first potentiometer and controlled by a servo shaft displaced according to the value $\bar{\mu}_x$ and the fourth input is derived from the wiper of a third potentiometer having an input derived from the output of the said summing amplifier and controlled by a servo shaft displaced according to the value $T_{AMB}$.

6. Ground-based aircraft flight simulating apparatus as claimed in claim 1, in which a signal representative of minus Mach number squared is applied to the inputs of first and second non-linear units, having input/output characteristics such that appreciable output signals are provided only above a predetermined input signal value and also such that output signals are related to the input signals by a law of greater power than the square law, to provide respectively signals representative of the rotor drag coefficient and the rotor thrust coefficient.

7. Ground-based aircraft flight simulating apparatus as claimed in claim 6, in which at least one of said first and second non-linear units comprises three diode and resistor series combinations having the three resistor ends connected together at the output terminal of the unit and each diode having first and second resistors connected to the input thereof, each first resistor having an input signal representative of the value of minus Mach number squared and each second resistor having an input of positive polarity and predetermined amplitude.

References Cited

UNITED STATES PATENTS

| | | | |
|---|---|---|---|
| 2,784,501 | 3/1957 | Stern et al. | 35—12 |
| 3,004,351 | 10/1961 | Hunt et al. | 35—12 |

FOREIGN PATENTS

| | | |
|---|---|---|
| 638,190 | 3/1962 | Canada. |

EUGENE R. CAPOZIO, *Primary Examiner.*

R. WEIG, *Assistant Examiner.*